Sept. 9, 1924.

L. J. BRUNE

LOCK NUT

Filed Oct. 25, 1923

1,508,316

Inventor
L. J. Brune
By D. Swift
Attorney

Patented Sept. 9, 1924.

1,508,316

UNITED STATES PATENT OFFICE.

LOUIS J. BRUNE, OF CHICAGO, ILLINOIS.

LOCK NUT.

Application filed October 25, 1923. Serial No. 670,734.

*To all whom it may concern:*

Be it known that I, LOUIS J. BRUNE, a citizen of the United States, residing at Chicago, in the county of Cook, State of Illinois, have invented a new and useful Lock Nut; and I do hereby declare the following to be a full, clear, and exact description of the invention, such as will enable others skilled in the art to which it appertains to make and use the same.

The invention relates to lock nuts, and has for its object to provide a device of this character wherein the lock nut is positively locked against retrograde rotation incident to vibration and the like, and the nut not modified in structure.

A further object is to provide a lock nut comprising a pliable sleeve disposed on the outer end of a bolt shank in engagement with the outer side of a nut on the shank and covering any of a plurality of depressions in the bolt whereby a tool may be applied to the sleeve, over the depression and a portion of the sleeve forced inwardly into the depression for locking the sleeve and nut against displacement.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
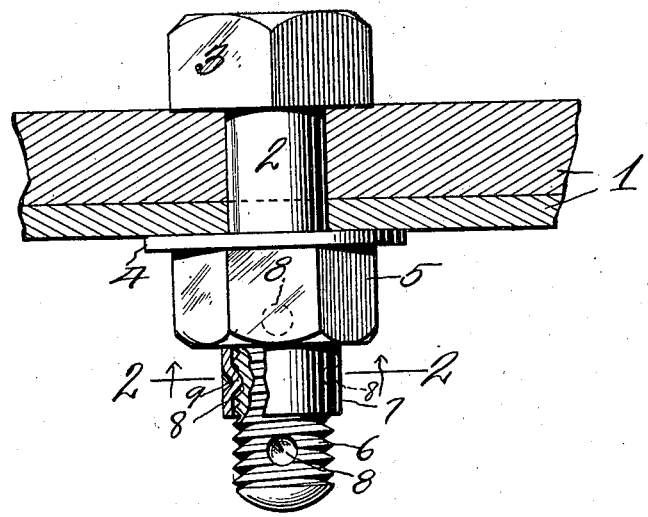
Figure 1 is a side elevation of the bolt, part of the sleeve being broken away to better show the structure.
Figure 2:
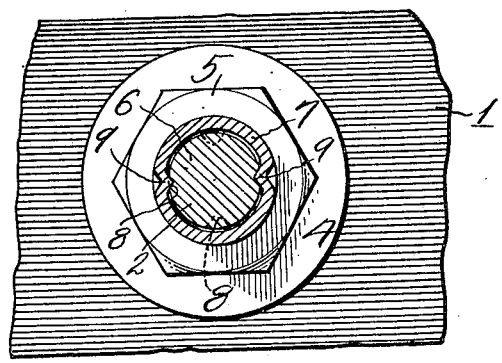
Figure 2 is a transverse sectional view taken on line 2—2 of Figure 1.
Figure 3:
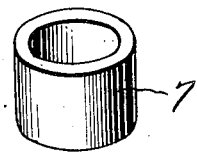
Figure 3 is a perspective view of the pliable washer.

Referring to the drawing, the numeral 1 designates adjacent members, through which members the shank 2 of the bolt 3 extends. Disposed on the shank 2 is a washer 4, against which the nut 5 engages. Nut 5 is threaded on the threaded end 6 of the shank and when tightened, securely holds the members 1 together. It has been found that nuts threaded on bolts when subjected to considerable strain or vibration have a retrograde movement on the threaded shank of the bolt, and consequently wok loose. To obviate the above difficulty without materially modifying the construction of the nut or bolt, or weakening the nut or bolt, the sleeve 7 is provided. Sleeve 7 is preferably formed from a pliable material and telescopically engages over the threaded end 6 of the shank 2, after the nut 5 has been tightened. The shank 2 has its threaded end 6 provided with a plurality of diametrically disposed depressions 8, which depressions are in vertical and horizontal alinement, therefore it will be seen that after the sleeve 7 has been placed on the threaded shank 6, in engagement with the nut 5, portions of the sleeve 7 may be struck inwardly as shown at 9 and into the depressions 8, thereby preventing outward movement of the sleeve 7 and preventing rotation of the nut 5 in a retrograde direction. By alining the recesses 8 and diametrically disposing the same it will be seen that the operator may easily locate the positions of the holes 8 for striking in portions of the sleeve 7.

From the above it will be seen that a locked nut is provided, which is positively locked against retrograde movement, and one wherein, when it is desired to remove the nut, the sleeve 7 may be severed or a wrench applied to the nut 5, and the nut rotated in a retrograde direction, which action upon sufficient power being applied to the nut will force the struck in portions 9 out of the holes 8, and as the sleeve 7 is formed from a pliable soft material, the threads on the bolt shank 2 will not be damaged.

The invention having been set forth what is claimed as new and useful is:—

The combination with a nut threaded on a threaded shank of a bolt, of means for preventing retrograde movement of said nut, said means comprising a sleeve extending over the threaded shank of the bolt and formed from pliable material, said shank being provided with a plurality of vertically alined diametrically disposed recesses, and struck in portions carried by the sleeve and extending into any of said recesses.

In testimony whereof I have signed my name to this specification in the presence of two subscribing witnesses.

LOUIS J. BRUNE.

Witnesses:
E. R. MORSE,
C. McGRAY.